(12) United States Patent
Koshimizu et al.

(10) Patent No.: US 8,559,289 B2
(45) Date of Patent: Oct. 15, 2013

(54) OPTICAL PICKUP APPARATUS

(71) Applicants: Sanyo Electric Co., Ltd., Moriguchi (JP); Sanyo Optec Design Co., Ltd., Gunma-ken (JP)

(72) Inventors: Yuki Koshimizu, Ota (JP); Hiroyuki Ichikawa, Hanno (JP)

(73) Assignees: Sanyo Electric Co., Ltd. (JP); Sanyo Optec Design Co., Ltd. (JP)

( * ) Notice: Subject to any disclaimer, the term of this patent is extended or adjusted under 35 U.S.C. 154(b) by 0 days.

(21) Appl. No.: 13/660,207

(22) Filed: Oct. 25, 2012

(65) Prior Publication Data

US 2013/0107693 A1    May 2, 2013

(30) Foreign Application Priority Data

Oct. 27, 2011  (JP) .................................. 2011-235642

(51) Int. Cl.
   *G11B 7/00*  (2006.01)
(52) U.S. Cl.
   USPC .................................... 369/112.01; 369/120
(58) Field of Classification Search
   None
   See application file for complete search history.

(56) References Cited

U.S. PATENT DOCUMENTS 8,169,880 B2 *  5/2012  Kawamura et al. ...... 369/112.24
2009/0022040 A1 *  1/2009  Matsuda et al. ......... 369/112.24

FOREIGN PATENT DOCUMENTS

JP         2010-61781 A       3/2010

* cited by examiner

*Primary Examiner* — Paul Huber
(74) *Attorney, Agent, or Firm* — Cantor Colburn LLP

(57) ABSTRACT

An optical pickup apparatus includes: first and second laser diodes to emit first and second laser beams having first and second wavelengths for reading signals recorded in first and second optical discs, respectively; a first objective lens configured to condense the first laser beam onto the signal recording layer of the first optical disc; a second objective lens arranged, along with the first objective lens, in a radial direction of the first and the second optical discs, the second objective lens configured to condense the second laser beam onto the signal recording layer of the second optical disc; a first optical system configured to guide the first laser beam from the first laser diode to the first objective lens; and a second optical system configured to guide the second laser beam from the second laser diode to the second objective lens independently of the first optical system.

10 Claims, 5 Drawing Sheets

OPTICAL PICKUP APPARATUS

CROSS-REFERENCE TO RELATED APPLICATION

This application claims the benefit of priority to Japanese Patent Application No. 2011-235642, filed Oct. 27, 2011, of which full contents are incorporated herein by reference.

BACKGROUND OF THE INVENTION

1. Field of the Invention

The present invention relates to an optical pickup apparatus configured to perform an operation of reading signals recorded in an optical disc and an operation of recording signals into an optical disc using a laser beam.

2. Description of the Related Art

Optical disc apparatuses are widely used that are capable of performing a signal reading operation and a signal recording operation by irradiating a signal recording layer of an optical disc with a laser beam emitted from an optical pickup apparatus.

Although optical disc apparatuses that use optical discs called CD and DVD are generally in widespread use, optical disc apparatuses are recently developed that use optical discs with record densities improved, i.e., optical discs of the Blu-ray standard.

Infrared light having a wavelength of 785 nm is used as a laser beam for performing the operation of reading signals recorded in a CD-standard optical disc, and red light having a wavelength of 665 nm is used as a laser beam for performing the operation of reading signals recorded in a DVD-standard optical disc.

A transparent protective layer provided between a signal recording layer and an optical disc surface of a CD-standard optical disc has a thickness of 1.2 mm, and a numerical aperture is set to 0.47 in an objective lens used for performing the operation of reading signals from this signal recoding layer. A transparent protective layer provided between a signal recording layer and an optical disc surface of a DVD-standard optical disc has a thickness of 0.6 mm, and a numerical aperture is set to 0.6 in an objective lens used for performing the operation of reading signals from this signal recoding layer.

In contrast to the CD-standard and DVD-standard optical discs, a laser beam having a shorter wave length, such as blue-violet light having a wavelength of 405 nm, is used as a laser beam for performing the operation of reading signals recorded in a Blu-ray-standard optical disc.

A protective layer provided on a top surface of a signal recording layer of the Blu-ray-standard optical disc has a thickness of 0.1 mm, and a numerical aperture is set to 0.85 in an objective lens used for performing the operation of reading signals from the signal recording layer.

It is necessary to reduce the diameter of a laser spot formed by condensing a laser beam so as to read signals recorded on the signal recording layer and recording signals onto the signal recording layer provided in a Blu-ray-standard optical disc. An objective lens used for acquiring a desired laser spot shape has not only an increased numerical aperture but also a shortened focal length, and is therefore characterized by a reduced curvature radius of the objective lens.

An optical disc apparatus has been commercialized that is capable of performing the operation of reading signals recorded in all the optical discs of the CD standard, the DVD standard, and the Blu-ray standard described above, and the operation of recording signals thereinto, and as an optical pickup apparatus built into such an optical disc apparatus, an optical pickup apparatus is generally employed that incorporates: a laser diode configured to emit a first laser beam for performing the operation of reading signals recorded in a Blu-ray-standard optical disc; a first objective lens configured to condense the first laser beam emitted from the laser diode onto a signal recording layer; a two-wavelength laser diode configured to emit a second laser beam for performing the operation of reading signals recorded in a DVD-standard optical disc and a third laser beam for performing the operation of reading signals recorded in a CD-standard optical disc; and a second objective lens configured to condense the second laser beam and the third laser beam onto signal recording layers of the respective optical discs (see Japanese Laid-Open Patent Publication No. 2010-61781).

In order to miniaturize an optical pickup apparatus configured to perform the operation of reading signals recorded in three types of optical discs compatible with different standards using a laser diode configured to emit a laser beam having one wavelength, a two-wavelength laser diode emitting laser beams having two wavelengths, and two objective lenses, commonality of optical paths of the first laser beam, the second laser beam, and the third laser beam is provided. An optical pickup apparatus with such a configuration will be described with reference to FIGS. 4 and 5.

In FIG. 4, reference numeral 1 denotes a laser diode configured to generate and emit a first laser beam of blue-violet light having a wavelength of 405 nm, for example, and reference numeral 2 denotes a first diffraction grating on which the first laser beam emitted from the laser diode 1 is incident, and which includes: a diffraction grating unit 2a configured to divide the laser beam into a main beam of zero-order light and two sub-beams of plus first-order light and minus first-order light; and a half-wave plate 2b configured to convert an incident laser beam into S-linearly-polarized light.

Reference numeral 3 denotes a two-wavelength laser diode in which a first laser element, configured to generate and emit a second laser beam of red light having a wavelength of 655 nm, and a second laser element, configured to generate and emit a third laser beam of infrared light having a wavelength of 785 nm, for example, are housed in the same case.

Reference numeral 4 denotes a second diffraction grating on which the second laser beam emitted from the first laser element and the third laser beam emitted from the second laser element, the elements built into the two-wavelength laser diode 3, are incident, and which includes: a diffraction grating unit 4a configured to divide the laser beam into a main beam of zero-order light and two sub-beams of plus first-order light and minus first-order light; and a half-wave plate 4b configured to convert an incident laser beam into S-linearly-polarized light.

Reference numeral 5 denotes a divergence lens which is provided in a position where the second laser beam and the third laser beam emitted from the two-wavelength laser diode 3 are incident through the second diffraction grating 4, and which has a function of adjusting a divergent angle of the incident laser beams of diverging light.

Reference numeral 6 denotes a semitransparent mirror configured to reflect the S-polarized light of the first laser light having passed through the first diffraction grating 2 and incident thereon as well as allow the P-polarized light, which is return light of the first laser beam, the second laser beam, and the third laser beam reflected from an optical disc through an optical path described later, to pass therethrough. Reference numeral 7 denotes a polarizing beam splitter configured to reflect the S-polarized light of the second laser beam and the third laser beam incident thereon through the second diffraction grating 4 and the divergence lens 5, allow the first laser beam, having been reflected by the semitransparent mirror 6 and incident thereon, to pass therethrough, and allow the P-polarized light, which is return light of the first laser beam, the second laser beam, and the third laser beam reflected from an optical disc, to pass therethrough.

Reference numeral 8 denotes a three-wavelength compatible quarter-wave plate, which is provided in a position where the first laser beam, having passed through the polarizing beam splitter 7, and the second and the third laser beams, reflected by the polarizing beam splitter 7, are incident, and which has an effect of converting the incident laser beam from linearly-polarized light into circularly-polarized light and reversely from circularly-polarized light into linearly-polarized light according to laser beams having three different wavelengths.

Reference numeral 9 denotes a collimating lens on which the laser beam having passed through the quarter-wave plate 8 is incident and which is configured to convert the incident laser beam into parallel light, and is also configured to correct the spherical aberration caused by an operation of displacing the collimating lens 9 in an optical axis direction due to a thickness of a protective layer of an optical disc.

Reference numeral 10 denotes a first objective lens configured to condense the first laser light onto a signal recording layer L1 provided in a first optical disc D1 (see FIG. 5), and reference numeral 11 denotes a second objective lens compatible with two wavelengths configured to condense the second laser beam onto a signal recording layer L2 provided in a second optical disc D2 and condense the third laser beam onto a signal recording layer L3 provided in a third optical disc D3. In such a configuration, the first objective lens 10 and the second objective lens 11 are mounted on a member called a lens holder supported by four support wires so as to enable a displacement operation in a focusing direction, which is a direction orthogonal to a surface of an optical disc, and a displacement operation in a tracking direction, which is a radial direction of an optical disc, for example.

The first laser beam, the second laser beam, and the third laser beam having passed through the collimating lens 9 are guided by an optical system depicted in FIG. 5 to the first objective lens 10 and the second objective lens 11. In FIG. 5, reference numeral 12 denotes a wavelength selectivity element configured to allow the first laser beam to pass therethrough and reflect the second laser beam and the third laser beam in the direction of the second objective lens 11. Reference numeral 13 denotes a raising mirror configured to reflect the first laser beam having passed through the wavelength selective element 12 in the direction of the first objective lens 10.

In such a configuration, the first laser beam having passed through the collimating lens 9 passes through the wavelength selective element 12 and is reflected by the raising mirror 13, to be made incident on the first objective lens 10. The first laser beam incident on the first objective lens 10 as such is condensed by the focusing operation of the first objective lens 10 onto the signal recording layer L1 provided in the first optical disc D1.

The second laser beam having passed through the collimating lens 9 is reflected by the wavelength selective element 12 and is incident on the second objective lens 11. The second laser beam incident on the second objective lens 11 as such is condensed by the focusing operation of the second objective lens 11 onto the signal recording layer L2 provided in the second optical disc D2. The third laser beam having passed through the collimating lens 9 is reflected by the wavelength selective element 12 and incident on the second objective lens 11. The third laser beam incident on the second objective lens 11 as such is condensed by the focusing operation of the second objective lens 11 onto the signal recording layer L3 provided in the third optical disc D3.

In such a configuration, the first laser beam emitted from the laser diode 1 is incident, via the first diffraction grating 2, the semitransparent mirror 6, the polarizing beam splitter 7, the quarter-wave plate 8, the collimating lens 9, the wavelength selective element 12, and the raising mirror 13, on the first objective lens 10, and thereafter is applied as an irradiation spot by the focusing operation of the first objective lens 10 onto the signal recording layer L1 provided in the first optical disc D1, and the first laser beam applied to the signal recording layer L1 is reflected as return light by the signal recording layer L1.

The second laser beam emitted from the first laser element of the two-wavelength laser diode 3 is incident, via the second diffraction grating 4, the divergence lens 5, the polarizing beam splitter 7, the quarter-wave plate 8, the collimating lens 9, and the wavelength selective element 12, on the second objective lens 11, and thereafter is applied as an irradiation spot by the focusing operation of the second objective lens 11 onto the signal recording layer L2 provided in the second optical disc D2, and the second laser beam applied to the signal recording layer L2 is reflected as return light by the signal recording layer L2.

The third laser beam emitted from the second laser element of the two-wavelength laser diode 3 is incident, via the second diffraction grating 4, the divergence lens 5, the polarizing beam splitter 7, the quarter-wave plate 8, the collimating lens 9, and the wavelength selective element 12, on the second objective lens 11, and thereafter is applied as an irradiation spot by the focusing operation of the second objective lens 11 onto the signal recording layer L3 provided in the third optical disc D3, and the third laser beam applied to the signal recording layer L3 is reflected as return light by the signal recording layer L3.

The return light of the first laser beam reflected from the signal recording layer L1 of the first optical disc D1 is incident, via the first objective lens 10, the raising mirror 13, the wavelength selective element 12, the collimating lens 9, the quarter-wave plate 8, and the polarizing beam splitter 7, on the semitransparent mirror 6. The return light incident on the semitransparent mirror 6 as such has been changed into linearly-polarized light in the P-direction by the phase shift operation of the quarter-wave plate 8. Therefore, the return light of the first laser beam is not reflected by the semitransparent mirror 6 and passes through the semitransparent mirror 6 as a control laser beam.

The return light of the second laser beam reflected from the signal recording layer L2 of the second optical disc D2 is incident on the semitransparent mirror 6 through the second objective lens 11, the wavelength selective element 12, the collimating lens 9, the quarter-wave plate 8, and the polarizing beam splitter 7. The return light incident on the semitransparent mirror 6 as such has been changed into linearly-polarized light in the P-direction by the phase shift operation of the quarter-wave plate 8. Therefore, the return light of the second laser beam is not reflected by the semitransparent mirror 6 and passes through the semitransparent mirror 6 as a control laser beam.

The return light of the third laser beam reflected from the signal recording layer L3 of the third optical disc D3 is incident, via the second objective lens 11, the wavelength selective element 12, the collimating lens 9, the quarter-wave plate 8, and the polarizing beam splitter 7, on the semitransparent mirror 6. The return light incident on the semitransparent mirror 6 as such has been changed into linearly-polarized light in the P-direction by the phase shift operation of the quarter-wave plate 8. Therefore, the return light of the third laser beam is not reflected by the semitransparent mirror 6 and passes through the semitransparent mirror 6 as a control laser beam.

Reference numeral 14 denotes an astigmatism plate on which the control laser beams having passed through the semitransparent mirror 6, and which has a function of increasing the magnitude of the astigmatism caused by the semitransparent mirror 6 so as to become the magnitude suitable for generating a focus error signal, and has a function of correcting the coma aberration caused by the semitransparent mirror 6. This astigmatism plate is an optical element called an aberration correction plate.

Reference numeral 15 denotes a photodetector on which the control laser beams are applied through the astigmatism plate 14, and which includes a well-known four-divided sensor, etc., as depicted in FIG. 3, and is configured to perform a signal generating operation associated with an operation of reading signals recorded on a signal recording layer of an optical disc and a focus error signal generating operation for performing a focusing control operation by an astigmatic method through an irradiation operation of the main beam, as well as a tracking error signal generating operation for performing a tracking control operation through an irradiation operation of the two sub-beams.

As described above, when comparing the outward path of the first laser beam emitted from the laser diode 1 to the signal recording layer L1 of the first optical disc D1, the outward path of the second laser beam emitted from the two-wavelength laser diode 3 to the signal recording layer L2 of the second optical disc D2, and the outward path of the third laser beam emitted from the two-wavelength laser diode 3 to the signal recording layer L3 of the third optical disc D3, it is understood that the optical path from the polarizing beam splitter 7 to the wavelength selective element 12 is used in common thereamong.

When comparing the return path of the return light of the first laser beam reflected from the signal recording layer L1 of the first optical disc D1 to the photodetector 15, the return path of the return light of the second laser beam reflected from the signal recording layer L2 of the second optical disc D2 to the photodetector 15, and the return path of the return light of the third laser beam reflected from the signal recording layer L3 of the third optical disc D3 to the photodetector 15, it is understood that the optical path from the wavelength selective element 12 to the photodetector 15 is used in common there among.

In an optical pickup apparatus depicted in FIG. 14, all the laser beams use, in common, the outward path guiding the laser beams to the signal recording layers of the optical discs and the return path guiding the return light reflected from the signal recording layers of the optical discs to the photodetector 15, which leads to such advantages that the number of optical components can be reduced, thereby being able to not only reduce the cost of manufacturing but also miniaturize the optical pickup apparatus.

The photodetector 15 includes four-divided sensors as depicted in FIG. 3, and in FIG. 3, reference numeral 15A denotes a main-beam light-receiving portion irradiated with the return light of the main beam, and reference numerals 15B and 15C denote sub-beam light-receiving portions irradiated with the return light of the sub-beams. The photodetector with such a configuration performs: an operation of generating the focus error signal for performing the focusing control operation of condensing a laser beam onto a signal recording layer provided in an optical disc; and an operation of generating the tracking error signal for performing the tracking control operation of causing a laser beam to follow a signal track provided in the signal recording layer, however, these operations are well known and will not be described.

The operation of generating the focus error signal is performed by executing subtraction with respect to signals, obtained by adding signals acquired from diagonally arranged sensors of the four sensors configuring the main-beam light-receiving portion 15A, and a configuration is made so as to utilize a change of a laser spot shape into an oval shape occurring associated with displacement of the objective lens in a direction of a signal surface of an optical disc.

The focus control method utilizing such a focus error signal is referred to as an astigmatic method and a configuration is made such that such astigmatism is generated by the semitransparent mirror 6 and the astigmatism plate 14 depicted in FIG. 4. The rising angle of the laser beam relative to the tangential direction of the optical disc is set to 45 degrees such that the direction in which the laser spot formed by irradiation of the return light reflected from the signal recording layer of the optical disc on the main-beam light-receiving portion 15A is changed in shape becomes the diagonal direction of the four sensors.

In the optical pickup apparatus with such a configuration, if an optical configuration is common among the laser beams having three different wavelengths, such problems are caused that not only high-accuracy optical components are necessary but also an advanced assembly technique is required for assembly work etc.

SUMMARY OF THE INVENTION

An optical pickup apparatus according to an aspect of the present invention, includes: An optical pickup apparatus comprising: a first laser diode configured to emit a first laser beam having a first wavelength for reading signals recorded in a first optical disc having a first distance from a surface thereof to a signal recording layer thereof; a second laser diode configured to emit a second laser beam having a second wavelength, longer than the first wavelength, for reading signals recorded in a second optical disc having a second distance, longer than the first distance, from a surface thereof to a signal recording layer thereof; a first objective lens configured to condense the first laser beam onto the signal recording layer of the first optical disc; a second objective lens arranged, along with the first objective lens, in a radial direction of the first and the second optical discs, the second objective lens configured to condense the second laser beam onto the signal recording layer of the second optical disc; a first optical system configured to guide the first laser beam from the first laser diode to the first objective lens; and a second optical system configured to guide the second laser beam from the second laser diode to the second objective lens independently of the first optical system.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

The present invention relates to an optical pickup apparatus configured to perform an operation of reading signals recorded on signal recording layers provided in optical discs of different standards, utilizing a first laser diode configured to generate a first laser beam and a second laser diode configured to generate a second laser beam having a wavelength longer than the wavelength of the first laser beam.

Figure 1:
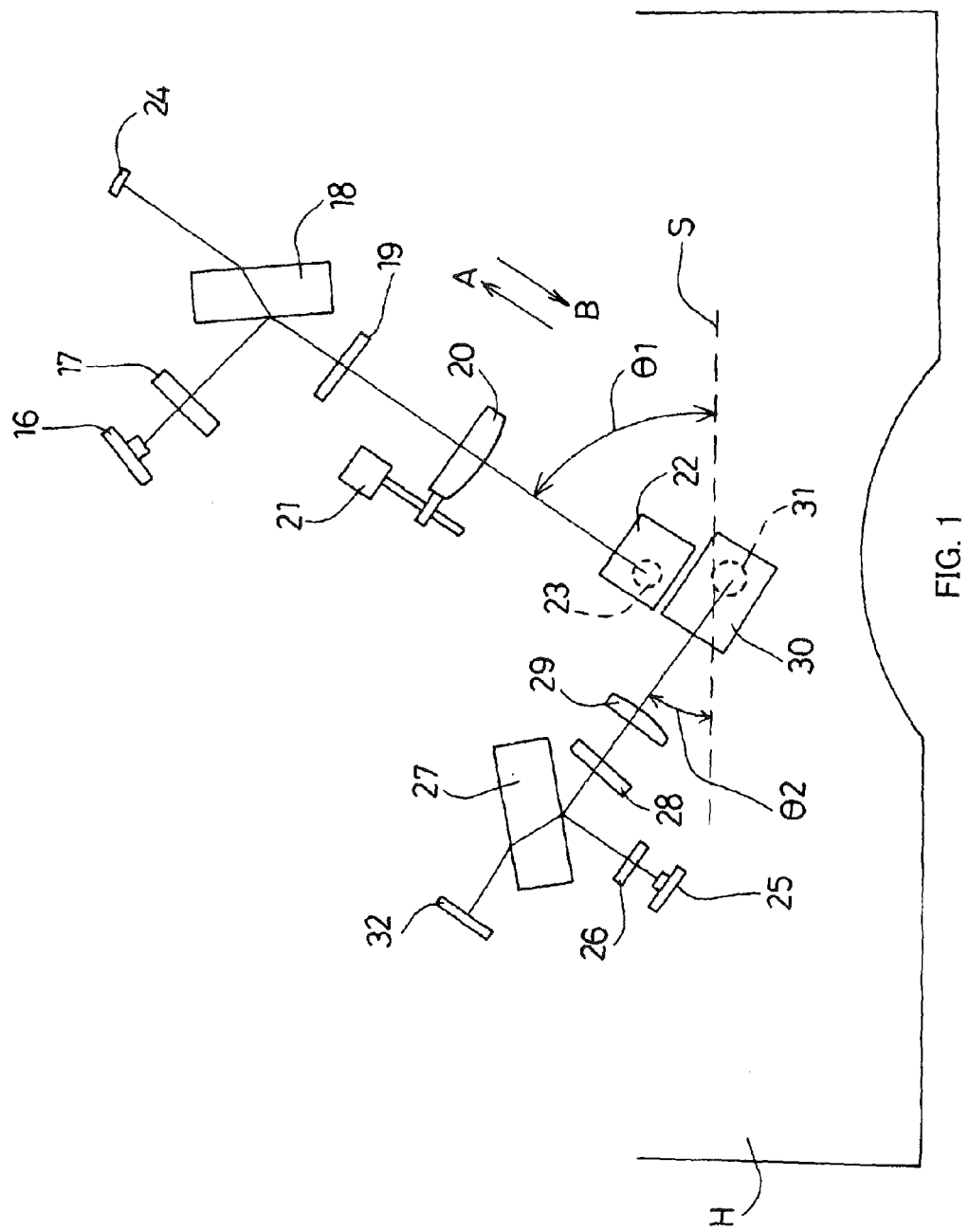
FIG. 1 is a schematic view illustrating an optical pickup apparatus according to an embodiment of the present invention.

FIG. 1 is a schematic view of an example of an optical pickup apparatus according to an embodiment of the present invention, when viewed in a direction perpendicular to a surface of an optical disc. In FIG. 1, reference numeral 16 denotes a first laser diode configured to generate and emit a first laser beam of blue-violet light having a wavelength of 405 nm, for example. Reference numeral 17 denotes a first diffraction grating whereon the first laser beam emitted from the first laser diode 16 is incident, and includes: a diffraction grating unit configured to split the first laser beam into a main beam of zero-order light and two sub-beams of plus first-order diffracted light and minus first-order diffracted light; and a half-wave plate configured to convert the first laser beam into linearly-polarized light in an S direction.

Reference numeral 18 denotes a first parallel plate provided as a polarizing beam splitting means (polarizing beam splitter) configured to reflect the S-polarized light of the first laser beam incident thereon through the first diffraction grating 17 as well as allow P-polarized light to pass therethrough, which is return light of the first laser beam reflected from a signal recording layer of a first optical disc through an optical path, which will be described later.

Reference numeral 19 denotes a quarter-wave plate provided in a position where the first laser beam reflected by the first parallel plate 18 is incident, and has a function of converting the incident laser beam from linearly-polarized light into circularly-polarized light and, to the contrary, from circularly-polarized light into linearly-polarized light. Reference numeral 20 denotes a first collimating lens whereon the first laser beam having passed through the quarter-wave plate 19 is incident and which converts the first laser beam incident thereon into parallel light, and is further configured to be displaced by an aberration correction motor 21 in optical axis directions, i.e., directions of arrows A and B.

Reference numeral 22 denotes a first raising mirror whereon the first laser beam, having been converted into parallel light by the first collimating lens 20, is incident, and which reflects the first laser beam in the direction of a first objective lens 23 configured to condense the first laser beam onto the signal recording layer of the first optical disc.

In such a configuration, the first laser beam generated and emitted from the first laser diode 16 is incident, via the first diffraction grating 17, the first parallel plate 18, the quarter-wave plate 19, the first collimating lens 20, and the first raising mirror 22, on the first objective lens 23, and is condensed onto the signal recording layer of the first optical disc by the condensing operation of the first objective lens 23. As such, the first laser beam emitted from the first laser diode 16 is applied as an irradiation spot onto the signal recording layer of the first optical disc by the condensing operation of the first objective lens 23, and the first laser beam applied to the signal recording layer is reflected by the signal recording layer as return light.

The return light of the first laser beam reflected from the signal recording layer of the first optical disc is incident on the first parallel plate 18 through the first objective lens 23, the first raising mirror 22, the first collimating lens 20, and the quarter-wave plate 19. As such, the return light incident on the first parallel plate 18 has been changed into linearly-polarized light in a P direction by the phase shifting operation of the quarter-wave plate 19. Therefore, the return light of the first laser beam is not reflected by the first parallel plate 18 and passes through the first parallel plate 18 as a control laser beam.

Figure 2:
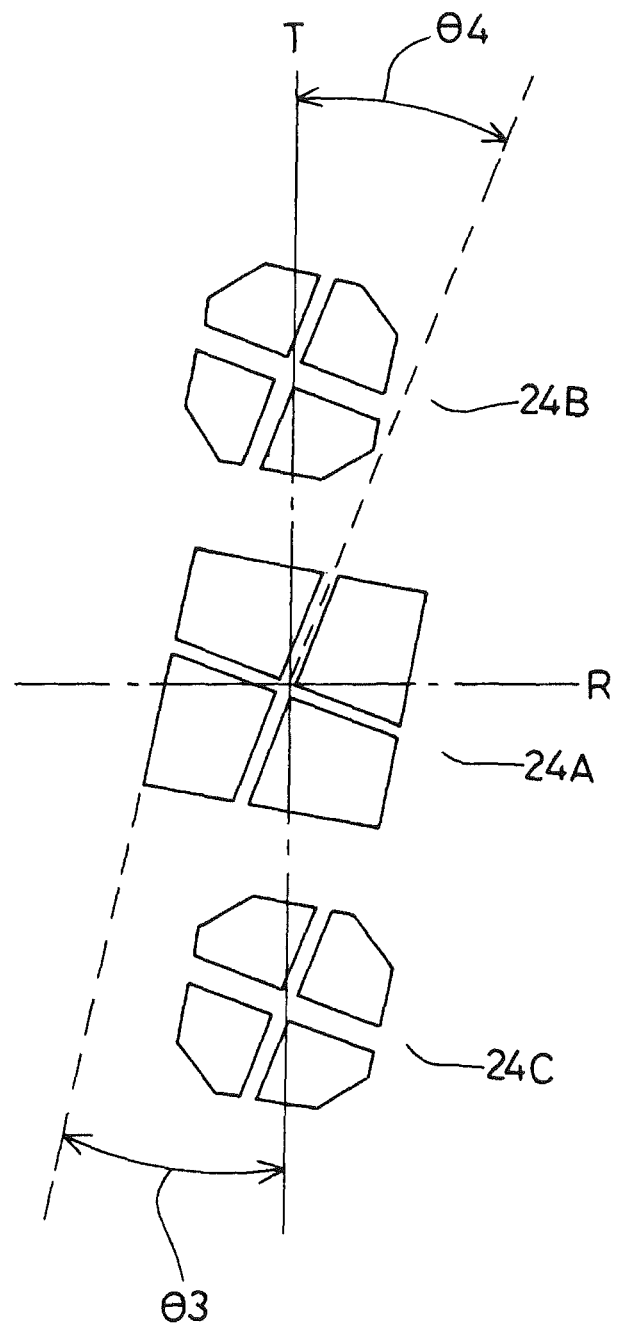
FIG. 2 is a plane view for describing a photodetector built into an optical pickup apparatus according to an embodiment of the present invention.

Reference numeral 24 denotes a first photodetector provided in a position irradiated with the control laser beam having passed through the first parallel plate 18, and the first photodetector 24 has a main-beam light-receiving portion 24A and sub-beam light-receiving portions 24B and 24C, each constituted by a four-divided sensor (quad sensor), arranged as depicted in FIG. 2.

A first optical system is configured as described above, in which the first laser beam generated and emitted from the first laser diode 16 is guided to the first objective lens 23 configured to condense the first laser beam onto the signal recording layer provided in the first optical disc, and a second optical system will then be described.

In FIG. 1, reference numeral 25 denotes a two-wavelength laser diode having a first laser element, configured to generate and emit a second laser beam of red light having a wavelength of 655 nm, and a second laser element, configured to generate and emit a third laser beam of infrared light having a wavelength of 785 nm, housed in the same case, for example, and the two-wavelength laser diode 23 is a second laser diode corresponding to the first laser diode 16 incorporated in the first optical system.

Reference numeral 26 denotes a second diffraction grating whereon the second laser beam emitted from the first laser element and the third laser beam emitted from the second laser element, incorporated in the two-wavelength laser diode 25, are incident, and the second diffraction grating 26 includes: a diffraction grating unit configured to split the laser beam into a main beam of zero-order light and two sub-beams of plus first-order diffracted light and minus first-order diffracted light; and a half-wave plate configured to convert an incident laser beam into linearly-polarized light in the S direction.

Reference numeral 27 denotes a second parallel plate provided as a polarizing beam splitting means configured to reflect the S-polarized light of the second and third laser beams incident thereon through the second diffraction grating 26 and as well as allow P-polarized light to pass therethrough, which is return light of the second and third laser beams reflected from a signal recording layer of a second optical disc and a signal recording layer of a third optical disc through an optical path, which will be described later.

Reference numeral 28 denotes a quarter-wave plate provided in a position where the second laser beam and the third laser beams reflected by the second parallel plate 27 is incident, and has a function of converting the incident laser beam from linearly-polarized light into circularly-polarized light and, to the contrary, from circularly-polarized light into linearly-polarized light. Reference numeral 29 denotes a second collimating lens whereon the second laser beam and the third laser beam having passed through the quarter-wave plate 28 is incident and which converts the second and the third laser beams incident thereon into parallel light.

Reference numeral 30 denotes a second raising mirror whereon the second laser beam and the third laser beam, having converted into parallel light by the second collimating lens 29, is incident, and which reflects the second laser beam and the third laser beam in the direction of a second objective lens 31 configured to condense the second laser beam and the third laser beam onto the signal recording layers respectively provided in the second optical disc and the third optical disc.

In such a configuration, the second laser beam and the third laser beam generated and emitted from the two-wavelength laser diode 25 are incident, via the second diffraction grating 26, the second parallel plate 27, the quarter-wave plate 28, the second collimating lens 29, and the second raising mirror 30, on the second objective lens 31, and are condensed onto the signal recording layers of the second optical disc and the third optical disc by the condensing operation of the second objective lens 31. As such, the second laser beam and the third laser beam emitted from the two-wavelength laser diode 25 are applied as an irradiation spot onto the signal recording layers of the second optical disc and the third optical disc by the condensing operation of the second objective lens 31, and the second laser beam and the third laser beam applied to the signal recording layers are reflected by the signal recording layers as return light.

The return light of the second laser beam and the third laser beam reflected from the signal recording layers of the second optical disc and the third optical disc are incident on the second parallel plate 27 through the second objective lens 31, the second raising mirror 30, the second collimating lens 29, and the quarter-wave plate 28. As such, the return light incident on the second parallel plate 27 has been changed into linearly-polarized lights in the P direction by the phase shifting operation of the quarter-wave plate 28. Therefore, the return light of the second laser beam and the third laser beam is not reflected by the second parallel plate 27 and passes through the second parallel plate 27 as control laser beams.

Reference numeral 32 denotes a second photodetector provided in a position irradiated with the control laser beams having passed through the second parallel plate 27, and the second photodetector incorporates light-receiving portions that are four-divided sensors.

The second optical system is configured as described above, in which the second laser beam and the third laser beam generated and emitted from the two-wavelength laser diode 25 are guided to the second objective lens 31 configured to condense the second laser beam and the third laser beam onto the signal recording layers provided in the second optical disc and the third optical disc.

The first optical system, which guides the first laser beam to the first objective lens 23, and the second optical system, which guides the second laser beam and the third laser beam to the second objective lens 31, are configured as described above, and the first optical system and the second optical system are incorporated in a housing H configuring the optical pickup apparatus. A positional relationship of the first optical system and the second optical system in the housing H will be described.

The first objective lens 23 configuring the first optical system and the second objective lens 31 configuring the second optical system are arranged in a radial direction of an optical disc as depicted in FIG. 1, and the second objective lens 31 is disposed closer to the inner circumference of the optical disc as compared to the first objective lens 23. The reasons for this arrangement are that such a drive mechanism is required to be incorporated that the collimating lens 20 incorporated in the first optical system is displaced in an optical axis direction, and that the configuration of the first optical system is increased in size as compared to the second optical system, which results from an increase in length of such displacement.

Figure 4:
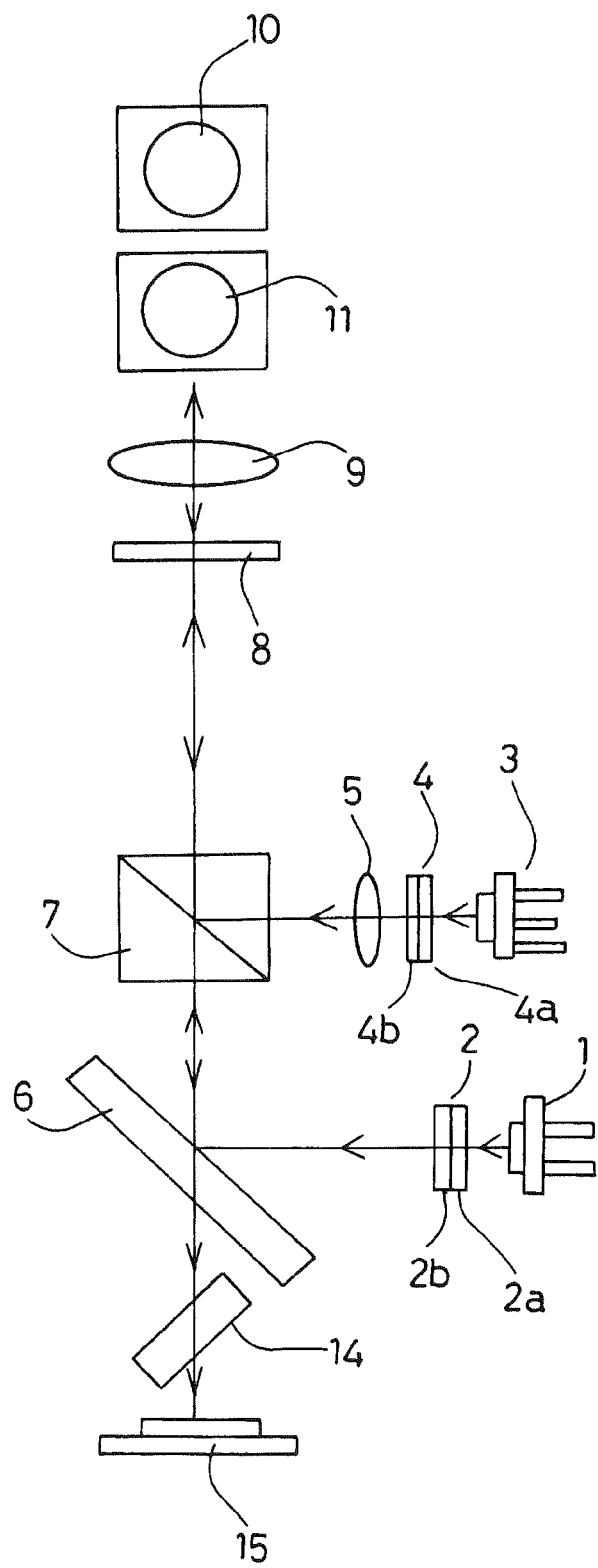
FIG. 4 is a schematic view illustrating an embodiment of an optical pickup apparatus.
Figure 5:
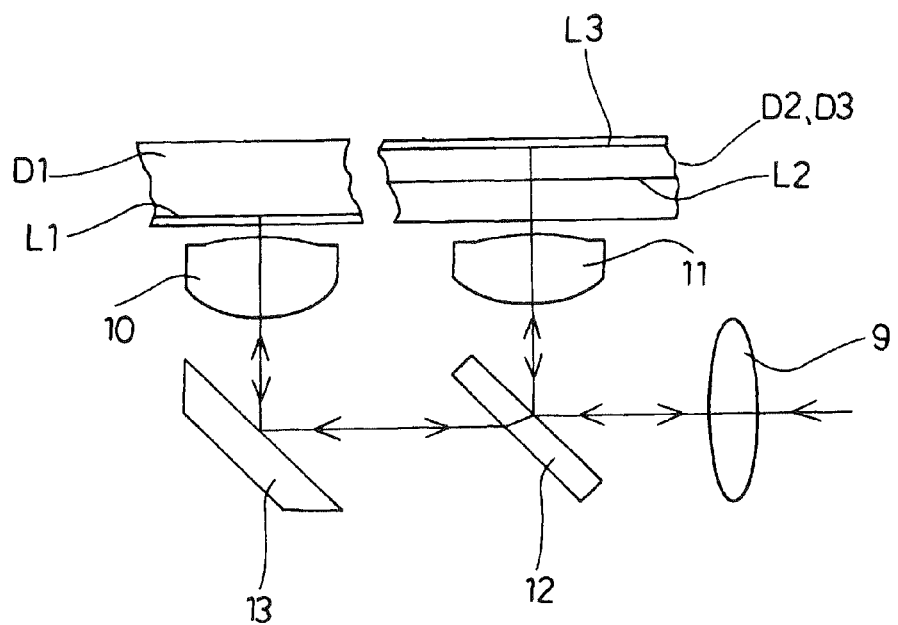
FIG. 5 is a side view illustrating a portion of an optical pickup apparatus.

In the case where the optical pickup apparatus is reduced in size and thickness, it is required to remove the astigmatism plate 14 depicted in FIG. 4, i.e., the aberration correction plate configured to cause or correct astigmatism. Since the direction in which the laser spot formed by irradiation of return light reflected from the signal recording layer of the optical disc on the main-beam light-receiving portion is changed in shape is the diagonal direction of the four sensors, the ideal rising angle relative to the tangential direction of the optical disc is 45 degrees as described above.

If the first optical system and the second optical system configured as described above are built into and arranged n the housing H, it is impossible to set the rising angle at 45 degrees, thereby not being able to remove the astigmatism plate As a result of exploring an angle enabling the removal of the astigmatism plate, it has been confirmed that the astigmatism plate can be removed if the rising angle relative to the tangential direction of the optical disc is 45 degrees±10 degrees. An embodiment of the present invention has been made in view of such a point and a description will be given of this point.

The first optical system according to an embodiment of the present invention is characterized in that a rising angle $\theta 1$ relative to a tangent line S is set to 55 degrees, i.e., 45 degrees plus 10 degrees, while in the second optical system, a rising angle $\theta 2$ relative to the tangent line S is set to 35 degrees, i.e., 45 degrees minus 10 degrees, as depicted in FIG. 1. Therefore, according to such a configuration, a crossing angle between the first optical system and the second optical system is 90 degrees. The angle $\theta 1$ is an angle formed between the optical axis of the first optical system and the tangent line S and the angle $\theta 2$ is an angle formed between the optical axis of the second optical system and the tangent line S and an angle not overlapping with the angle $\theta 1$.

Figure 3:
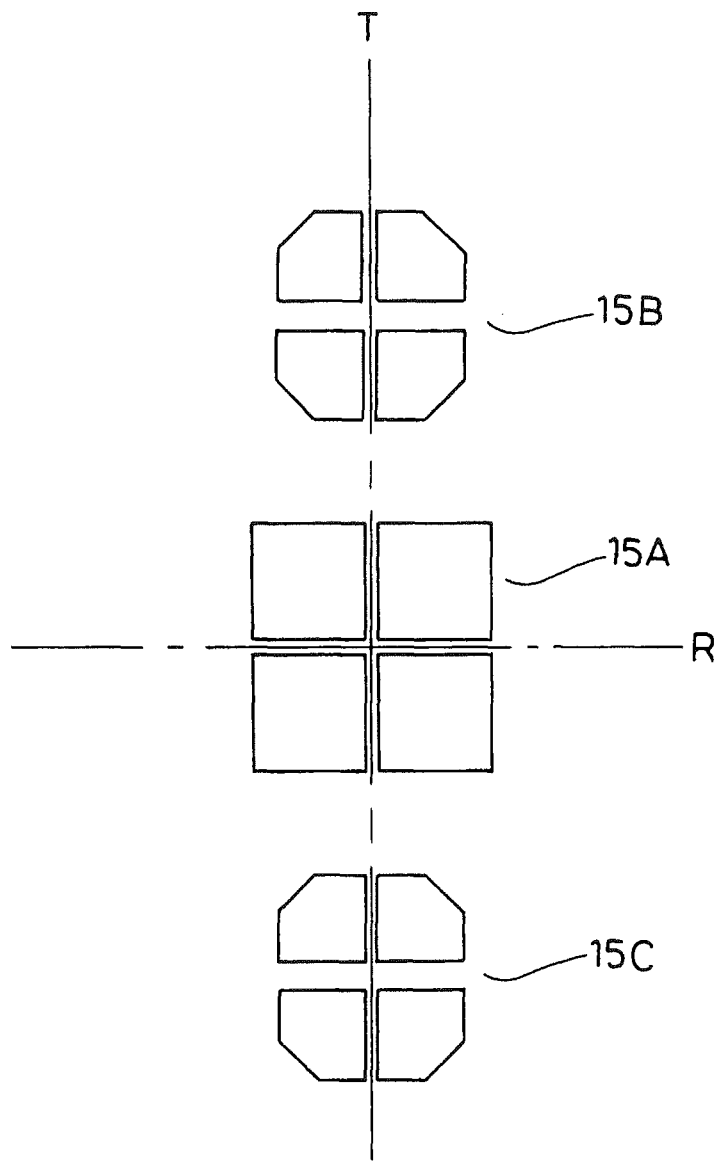
FIG. 3 is a plane view for describing a photodetector built into an optical pickup apparatus.

If the rising angle $\theta 1$ of the first optical system is set to 55 degrees, the direction of the angle with which the astigmatism occurs in the first parallel plate 18 results in a direction of 55 degrees, i.e., 45 degrees plus 10 degrees, in the clockwise direction with respect to a center line T depicted in FIG. 3 and a direction of 35 degrees, i.e., 45 degrees minus 10 degrees, in the anticlockwise direction with respect to a center line R orthogonal to the center line T. Therefore, in an embodiment of the present invention, a configuration is such that one side in the substantially longitudinal direction of the external form of each of the main-beam light-receiving portion 24A and the sub-beam light-receiving portions 24B and 24C is inclined at an angle $\theta 3$ relative to the center line T and one side in the substantially lateral direction of the external form of each of the light-receiving portions is inclined at the angle $\theta 3$ relative to the center line R, as depicted in FIG. 2. Here, the center line T indicates a line passing through the centers of the main-beam light-receiving portion 24A and the sub-beam light-receiving portions 24B and 24C, that is, the line corresponds to a direction in which three beams split by the first diffraction grading 17 are aligned on the light receiving surface on the first photodetector 24. Further, a direction of a broken line inclined at an angle θ4 relative to the center line T indicates a direction optically corresponding to the tracking direction. Out of two dividing lines dividing each of the main-beam light-receiving portion 24A and the sub-beam light-receiving portions 24B and 24C into four parts, one dividing line in a substantially lateral direction is inclined clockwise at the angle θ4 relative to the direction R, and the other dividing line in a substantially longitudinal direction is inclined clockwise at the angle θ4 relative to the direction T.

In an embodiment of the present invention, the angle θ3 and the angle θ4 are set to 10.9 degrees and 20.9 degrees, respectively, and setting to such angles enables the direction, in which the astigmatism of the light-receiving portions occurs, to be adjusted to 10 degrees, which corresponds to the variation in the angle with which the astigmatism occurs in the first parallel plate 18. In other words, if the rising angle θ1 of the first optical system is set to 55 degrees, one line of dividing lines dividing each of the main-beam light-receiving portion 24A and the sub-beam light-receiving portions 24B and 24C is set in the same direction as the tracking direction, and an angle θ4, at which the one line is inclined relative to a direction of alignment of three beams (direction of the center line T) affecting the tracking error signal generation operation, is set to 20.9 degrees, thereby being able to perform the tracking error signal generating operation by a differential push-pull method without trouble. Further the angle θ3, at which one side of the external form of each of the main-beam light-receiving portion 24A and the sub-beam light-receiving portions 24B and 24C is inclined relative to the center line T, is set to 10.9 degrees, thereby inclining the one side of the external form of each of the light-receiving portions, relative to the one line of dividing lines dividing each of the light-receiving portions, at 10 degrees, i.e., 20.9 degrees (θ4) minus 10.9 degrees (θ3), that is the variation in angle in the direction in which astigmatism occurs. Thus, the diagonal direction of each of the light-receiving portions of the four-divided sensors of the main-beam light-receiving portion 24A and the sub-beam light-receiving portions 24B and 24C are set in the same direction as the direction in which astigmatism occurs in each beam of the three beams, thereby being able to perform the focus error signal generating operation by a differential astigmatic method without trouble.

In the case where the rising angle θ2 of the second optical system is set to 35 degrees, the angle with which the astigmatism occurs in the second parallel plate 27 is inclined at 10 degrees, however, the light-receiving portions incorporated in the second photodetector 32 are inclined and arranged as is the case with the first optical system, thereby being able to perform the operations of generating the focus error signal and the tracking error signal without trouble.

The first objective lens 23 is disposed closer to the outer circumference of the optical disc as compared to the second objective lens 31 in an embodiment of the present invention. Since the first objective lens 23 is positioned with the closest distance to the surface of the optical disc and has the high potential to collide with non-signal recording area, etc., provided in the optical disc accompanying the displacement operation thereof, the first objective lens 23 can be disposed closer to the outer circumference, thereby being able to avoid the risk of collision.

The optical pickup apparatus with such an arrangement can be manufactured by reducing the diameter of the first objective lens 23 and the second objective lens 31. Although the first raising mirror 22 and the second raising mirror 30 incorporated in the first optical system are arranged in the vicinity of each other, the raising mirrors is formed into a parallelogram shape, etc., thereby being able to arrange the raising mirrors without trouble.

Although the two-wavelength laser diode is used for the second laser diode incorporated in the second optical system in an embodiment of the present invention, a laser diode configured to generate and emit a single laser beam is also usable. Although the parallel plate is used as the polarizing beam splitting means to selectively reflect and allow a laser beam to pass therethrough, other polarization beam splitting means are also usable.

Although a description has been given of the case where an embodiment according to the present invention is implemented in the optical pickup apparatus configured to perform the operation of reading signals recorded in the optical discs of the CD, DVD, and Blu-ray standards, the embodiment can be implemented in an optical pickup apparatus capable of performing an operation of reading signals recorded in an optical disc of another different standard.

In an embodiment of the present invention, in an optical pickup apparatus configured to condense the first and the second laser beams having different wavelengths onto signal recording layers provided in the first and the second optical discs of different standards to perform the operation of reading signals recorded on the signal recording layers, the first objective lens, configured to condense the first laser beam onto the signal recording layer of the first optical disc, and the second objective lens, configured to condense the second laser beam onto the signal recording layer of the second optical disc, are arranged in the radial direction of the optical discs, as well as the first optical system, configured to guide the first laser beam to the first objective lens, and the second optical system, configured to guide the second laser beam to the second objective lens, is independent of each other, thereby being able to achieve optical designs respectively suitable for the optical systems. In other words, in the optical pickup apparatus according to an embodiment of the present invention, since such an optical design is made in which an optical pickup apparatus operates for each of the optical systems in a dedicated manner, components dedicated thereto can be employed as optical components, and as a result, not only high-accuracy optical components are unnecessary but also advanced assembly work is unnecessary, thereby being able to reduce the price of the optical pickup apparatus.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
   a first laser diode configured to emit a first laser beam having a first wavelength for reading signals recorded in a first optical disc having a first distance from a surface thereof to a signal recording layer thereof;
   a second laser diode configured to emit a second laser beam having a second wavelength, longer than the first wavelength, for reading signals recorded in a second optical disc having a second distance, longer than the first distance, from a surface thereof to a signal recording layer thereof;
   a first objective lens configured to condense the first laser beam onto the signal recording layer of the first optical disc;
   a second objective lens arranged, along with the first objective lens, in a radial direction of the first and the second optical discs, the second objective lens configured to condense the second laser beam onto the signal recording layer of the second optical disc;

a first optical system configured to guide the first laser beam from the first laser diode to the first objective lens through reflection by a first raising mirror; and a second optical system configured to guide the second laser beam from the second laser diode to the second objective lens through reflection by a second raising mirror, independently of the first optical system, the first optical system including a first parallel plate configured to give astigmatism for generating a focus error signal to a reflected light beam of the first laser beam reflected from the first optical disc, and a first photodetector configured to be irradiated with the reflected light beam containing the astigmatism caused by the first parallel plate, the second optical system including a second parallel plate configured to give astigmatism for generating a focus error signal to a reflected light beam of the second laser beam reflected from the second optical disc, and a second photodetector configured to be irradiated with the reflected light beam containing the astigmatism caused by the second parallel plate;

wherein the first optical system is arranged such that an angle θ1 between an optical axis of the first optical system and a tangent line of the first and the second optical discs satisfies 45 degrees<θ1≤55 degrees, and wherein the second optical system is arranged such that an angle θ2, not overlapping with the angle θ1, between an optical axis of the second optical system and a tangent line of the first and the second optical discs satisfies 35 degrees≤θ2<45 degrees.

2. The optical pickup apparatus of claim 1, wherein the angle θ1 is 55 degrees, and
the angle θ2 is 35 degrees.

3. The optical pickup apparatus of claim 1, wherein the photodetector includes light-receiving portions configured to be respectively irradiated with reflected light beams of three beams obtained by splitting the first laser beam using a diffraction grating, wherein the light-receiving portions each include first to fourth light-receiving portions obtained by dividing the light-receiving portion into four parts, wherein one side of an external form of each of the light-receiving portions is inclined at a predetermined angle θ3 relative to a center line T passing through centers of the light-receiving portions, wherein one line of dividing lines dividing each of the light-receiving portions into four parts is inclined at a predetermined angle θ4 relative to the center line T, and wherein the one side of the external form of each of the light-receiving portions is inclined at a predetermined angle (θ4−θ3) relative to the one line of the dividing lines dividing each of the light-receiving portions into four parts, in accordance with the angle θ1.

4. The optical pickup apparatus of claim 3, wherein the predetermined angle (θ4−θ3) is 10 degrees.

5. The optical pickup apparatus of claim 1, wherein the first objective lens is arranged on an outer circumferential side of the first and the second optical discs, and wherein the second objective lens is arranged on an inner circumferential side of the first and the second optical discs.

6. An optical pickup apparatus comprising:

a laser diode configured to emit a first laser beam having a first wavelength for reading signals recorded in a first optical disc having a first distance from a surface thereof to a signal recording layer thereof;

a two-wavelength laser diode configured to emit two laser beams, which are a second laser beam having a second wavelength, longer than the first wavelength, for reading signals recorded in a second optical disc having a second distance, longer than the first distance, from a surface thereof to a signal recording layer thereof; and a third laser beam having a third wavelength, longer than the second wavelength, for reading signals recorded in a third optical disc having a third distance, longer than the second distance, from a surface thereof to a signal recording layer thereof;

a first objective lens configured to condense the first laser beam onto the signal recording layer of the first optical disc;

a second objective lens arranged, along with the first objective lens, in a radial direction of the first to the third optical discs, the second objective lens configured to condense the second laser beam onto the signal recording layer of the second optical disc, as well as condense the third laser beam onto the signal recording layer of the third optical disc;

a first optical system configured to guide the first laser beam from the laser diode to the first objective lens through reflection by a first raising mirror; and a second optical system configured to guide the second and the third laser beams from the two-wavelength laser diode to the second objective lens through reflection by a second raising mirror, independently of the first optical system, the first optical system including a first parallel plate configured to give astigmatism for generating a focus error signal to a reflected light beam of the first laser beam reflected from the first optical disc, and a first photodetector configured to be irradiated with the reflected light beam containing the astigmatism caused by the first parallel plate, the second optical system including a second parallel plate configured to give astigmatism for generating a focus error signal to a reflected light beam of the second laser beam reflected from the second optical disc and a reflected light beam of the third laser beam reflected from the third optical disc, and a second photodetector configured to be irradiated with the reflected light beam containing the astigmatism caused by the second parallel plate;

wherein the first optical system is arranged such that an angle θ1 between an optical axis of the first optical system and a tangent line of the first to the third optical discs satisfies 45 degrees<θ1≤55 degrees, and wherein the second optical system is arranged such that an angle θ2, not overlapping with the angle θ1, between an optical axis of the second optical system and a tangent line of the first to the third optical discs satisfies 35 degrees≤θ2<45 degrees.

7. The optical pickup apparatus of claim 6, wherein the angle θ1 is 55 degrees, and
the angle θ2 is 35 degrees.

8. The optical pickup apparatus of claim 6, wherein
the photodetector includes light-receiving portions configured to be respectively irradiated with reflected light beams of three beams obtained by splitting the first laser beam using a diffraction grating, wherein
the light-receiving portions each include first to fourth light-receiving portions obtained by dividing the light-receiving portion into four parts, wherein
one side of an external form of each of the light-receiving portions is inclined at a predetermined angle θ3 relative to a center line T passing through centers of the light-receiving portions, wherein
one line of dividing lines dividing each of the light-receiving portions into four parts is inclined at a predetermined angle θ4 relative to the center line T, and wherein
the one side of the external form of each of the light-receiving portions is inclined at a predetermined angle (θ4−θ3) relative to the one line of the dividing lines dividing each of the light-receiving portions into four parts, in accordance with the angle θ1.

9. The optical pickup apparatus of claim 8, wherein the predetermined angle (θ4−θ3) is 10 degrees.

10. The optical pickup apparatus of claim 6, wherein the first objective lens is arranged on an outer circumferential side of the first to the third optical discs, and wherein
the second objective lens is arranged on an inner circumferential side of the first to the third optical discs.

\* \* \* \* \*